Nov. 13, 1923.  
E. O. HAMREN  
FRICTION CLUTCH  
Filed Jan. 29, 1921  
1,473,626  
4 Sheets-Sheet 1

Witnesses:  
W. F. Kilroy  
Harry C. White

Inventor:  
Eric O. Hamren  
By Niles & Niles Attys.

Nov. 13, 1923.

E. O. HAMREN
FRICTION CLUTCH
Filed Jan. 29, 1921

Witnesses:
W. F. Kilroy
Harry B. White

Inventor:
Eric O. Hamren
By Nice & Nice
Attys

Nov. 13, 1923.

E. O. HAMREN

1,473,626

FRICTION CLUTCH

Filed Jan. 29, 1921

Witnesses:
W. F. Kilroy
Harry B. C. White

Inventor:
Eric O. Hamren
By Hill & Hill Attys.

Nov. 13, 1923.

E. O. HAMREN

FRICTION CLUTCH

Filed Jan. 29, 1921

Witnesses:
W. F. Kilroy
Harry B. White

Inventor:
Eric O. Hamren
By Hice & Hice Attys.

Patented Nov. 13, 1923.

1,473,626

UNITED STATES PATENT OFFICE.

ERIC O. HAMREN, OF CHICAGO, ILLINOIS.

FRICTION CLUTCH.

Application filed January 29, 1921. Serial No. 440,975.

*To all whom it may concern:*

Be it known that I, ERIC O. HAMREN, a citizen of the United States, residing at Chicago, in the county of Cook and State of Illinois, have invented certain new and useful Improvements in Friction Clutches, of which the following is a description.

My invention belongs to that general class of devices known as clutches, and relates particularly to a clutch mechanism wherein power is transmitted from a driving element to a driven element through suitable friction mechanism which may be controlled at will. The invention has among its objects the production of a device of the kind described that is simple, convenient, reliable, efficient, powerful, compact, durable and satisfactory for use wherever found applicable. It has particularly as an object the production of a device of the kind described which will operate quickly and easily both to engage or release without excessive wear of the parts and which will have high efficiency. It has also as an object the production of a clutch mechanism which may be constructed to operate in one direction, or in both directions, depending upon the uses intended. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts.

In the drawings I have shown only the preferred embodiment of the invention, two types being illustrated. Referring first to Figs. 1 to 8, inclusive, 1 represents a shaft or the equivalent, which may be termed the driving member, and 2 a part which may be termed the driven member, which in the construction shown is provided with the teeth 3, and constitutes a gear, but which may be made in the form of a gear, sprocket, pulley, sheave or any equivalent for the purpose. While under ordinary circumstances either one may represent the driving element, it is preferred to have the shaft 1 as the driving element, the same rotating in the direction indicated by the arrow in Fig. 2. The driven member or part 2 is mounted on a part 4, which is preferably secured to the shaft by a key 4' or any equivalent means for the purpose, 5 being a bearing member or renewable bushing which may be arranged as shown, if so desired. The driven member 2 is preferably extended as at 6 and recessed so as to form a chamber or casing, the inner face 7 being preferably constructed to cooperate with the friction member or element hereinafter described. The open end of the extending part 6 is normally closed by a plate 8, or equivalent means for the purpose, secured in place by screws 9 or the like, 9' being a packing of suitable material. In the construction shown, the plate 8 not only maintains the driven member in operative relation with the other parts of the mechanism, but also serves as a retainer for retaining oil or lubricant which may perhaps be supplied to the clutch. It is immaterial, however, in so far as the present invention is concerned, as to whether a lubricant or any other liquid or fluid is inserted in the casing for any purpose whatever. The member 4 is preferably extended within the casing, as indicated at 12, the same having outwardly extending portions 13 carried by the parts 14, and an extending part 15 which carries a stud or pin 16, which supports a yoke or member 17—18. The pin 16 forms substantially a support for the member 17—18, which is more or less flexible or yieldable, as will be hereinafter described, the yoke substantially floating on the pin. As shown, member 17—18 surrounds or embraces the shaft 1, and the same carries the friction element 19, which is in the form of a split ring, which extends around with the free end 20 brought substantially close to the opposite end which is anchored onto the portion 17, or secured thereto by screws 21 or equivalent means for the purpose. As most clearly shown in Fig. 3, portion 17 is cut away as indicated at 22 so that only a small portion of the member or ring 19 is prevented from having free play when expanded or contracted. Normally, the tendency of the ring is to contract away from the inner face 7 of part 6 so that the parts are out of engagement and there is no transmission between the shaft 1 and the part 2. The part 18 carries a pin 25 upon which are mounted rollers or friction-element cooperating members 26. I also prefer to provide one or more pins 27 and 29 on the yoke 17—18, which carry rollers 28 and 30 or the equivalent also arranged to cooperate with the friction element 19, as will be described in the operation of the device.

Figure 1:
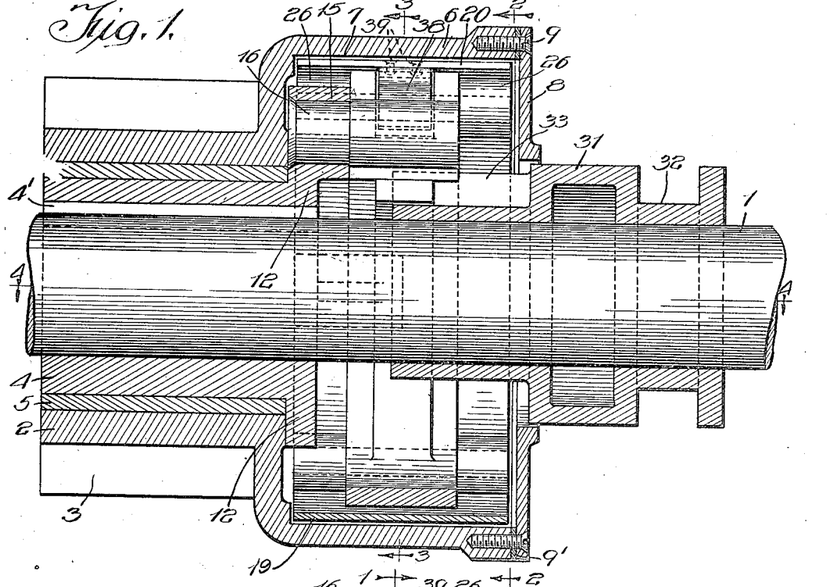
Fig. 1 is a sectional view taken substantially on line 1—1 of Fig. 2 of my improved mechanism.
Figure 2:
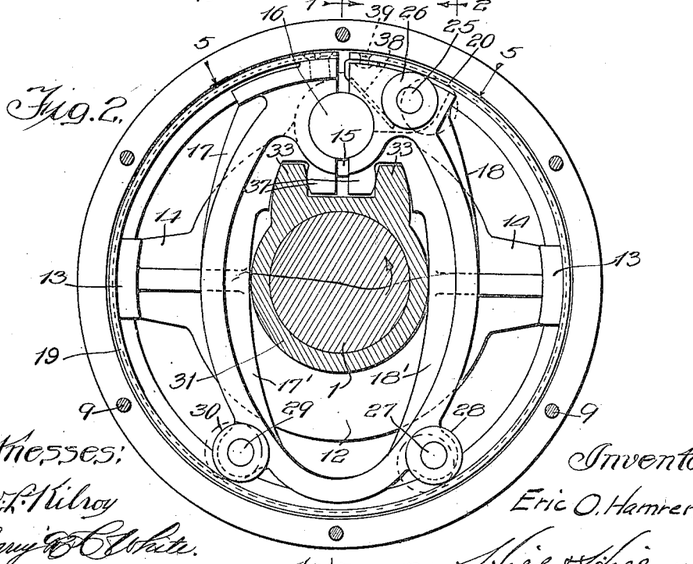
Fig. 2 is a sectional view taken substantially on line 2—2 of Fig. 1.
Figure 3:
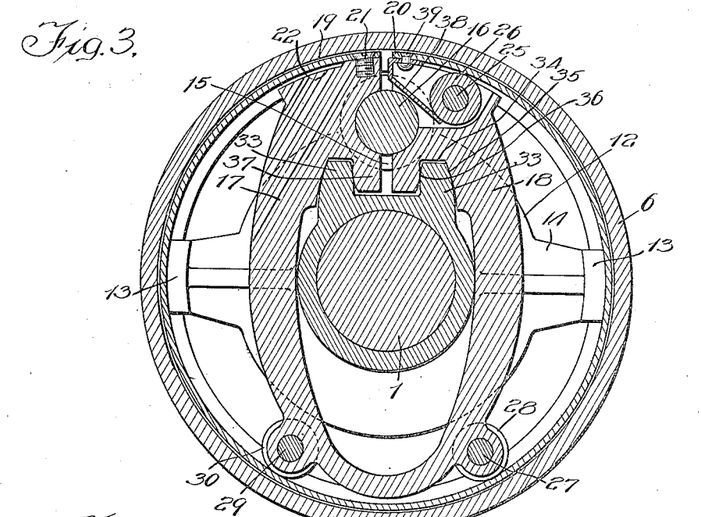
Fig. 3 is a sectional view taken substantially on line 3—3 of Fig. 1.
Figure 4:
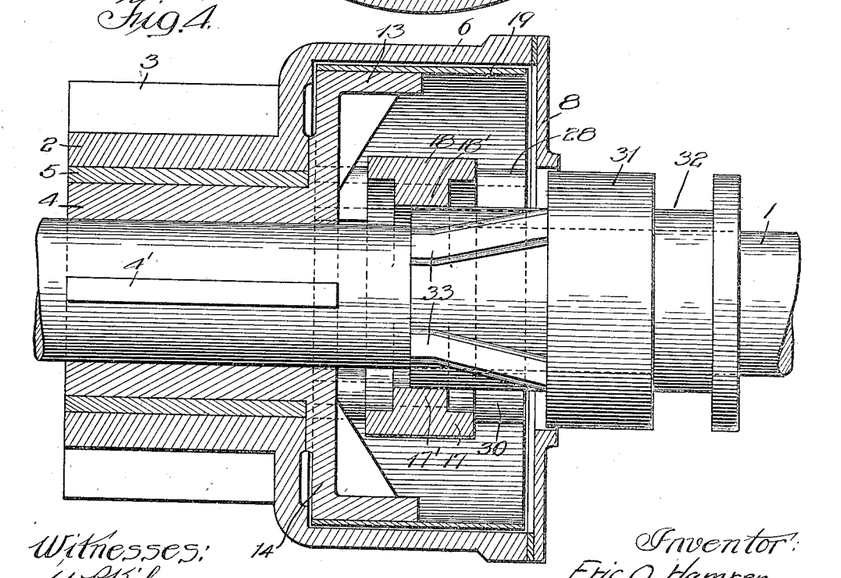
Fig. 4 is a sectional view taken substantially on line 4—4 of Fig. 1.
Figures 5, 6:
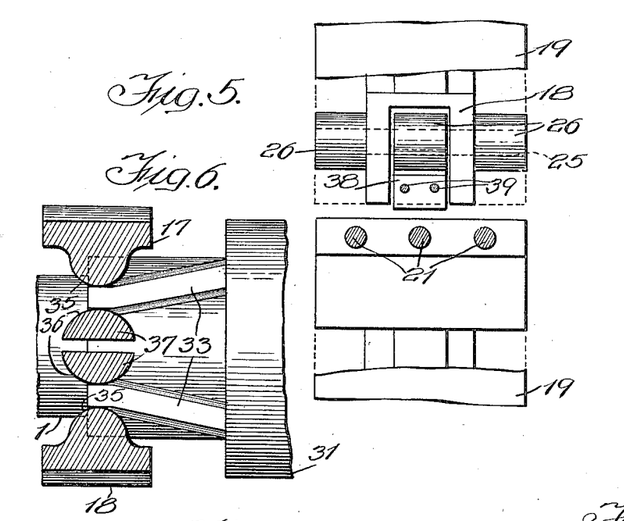
Fig. 5 is a view taken substantially on line 5—5 of Fig. 2.
Fig. 6 is a detail sectional view.

Referring to Figs. 1 and 2, 31 is a member mounted on the shaft 1, and which rotates therewith through its interconnection with the member 17—18, in a manner hereinafter described, but which may be moved longitudinally of the shaft. The same may be formed as indicated at 32 for engagement with a shift lever or any equivalent mechanism provided for operating the same. The member 31 extends inwardly through the plate 8 and into the chamber in part 6, and is formed with the projecting ribs 33 or the equivalent. As most clearly shown in Figs. 4 and 6, the ribs 33 are arranged on an angle or inclined so that the same substantially constitute cams having cam faces adapted to cooperate with suitable faces on the member 17—18. Member 17—18 is formed with faces 35 and with projecting parts 37 having faces 36. The faces 35 and 36 are spaced a sufficient distance apart, as indicated at 34 in Fig. 3, so that the ribs can project between the faces on the member 17—18. It will be particularly noted by referring to the drawings that the several faces are so designed as to give substantially a point contact, thereby making shifting of the parts comparatively easy. Obviously, as the member 31 is moved in or out the ribs 33 cooperating with the member 17—18 spread the ends of the same or move them together, as the case may be.

As was before mentioned, the friction element or ring 19 in the construction described, is secured to the member 17. I have also illustrated the opposite end of the friction element loosely secured to the portion 18 so that as member 18 springs or moves back to its inoperative position, it will cooperate or control the end of the friction element and positively break its engagement with the driven member. In the preferred construction, spring 38 is arranged at the extreme end 20 of the friction element and secured thereto by means of rivets 39 or any equivalents for the purpose. The part 38 is constructed to engage with the rollers 26.

The type of clutch mechanism described is intended to drive in one direction only, as ordinarily this is all that is necessary. The operation of the clutch may be briefly described as follows: When the member 31 is in its out position as indicated in Fig. 1, the friction element will be out of engagement with the driven element at face 7, but the two members 31 and 12 will be driven together, because the member 12 is splined to the shaft, driving the member 31 through the cams 33 and 37. The parts 13 guide or center the friction ring when out of operative driving position. This being the case, member 4, parts 17—18 and friction element, part 19, rotate freely within part 6, without driving part 6 and the driven element 2. When part 31 is pushed inwardly, the same tends to expand or separate the disconnected ends of part 17—18 at pin 16. The pin therefore is moved relatively of the separated ends of the yoke a slight distance and reengages one of the arcuate faces of the parts 37 (the left hand face shown in Fig. 2). Roller 26 tends to force the friction ring into engagement with the face 7, that is expands the ring into engagement with face 7, rocking the yoke member on the pivot 16. As part 17—18 is substantially rocked on its pivot 16, due to the rotating element engaging the relatively stationary element 2, rolls 28 and 30 also cooperate with the friction element, tending to expand and force the same into engagement with the driven element. Obviously as soon as the end 20 engages the face 7, the entire ring engages and becomes operative. The positive expansion at the three points causes a multiplying of the power, which may be transmitted without slippage, and the pressure is maintained until the clutch is released. When member 31 is withdrawn, releasing the clutch action, part 17—18 moves and releases the pressure. It will be noted that the end 20 of the friction element is quickly disengaged from the face 7, the disengagement being almost instantaneous about the entire friction element. The clutch parts substantially engage and disengage without slippage between the friction faces, this being particularly true with the disengaging. Some slippage during the engaging of course prevents shock and jar and strain on the parts. There is, however, no slippage against pressure during the releasing of the clutch. It will be particularly noted that the clutch is substantially self-adjusting. That is to say, is so constructed that wearing of the parts does not throw the same out of adjustment or require a readjustment. It may be mentioned that I have not shown the friction ring 19 provided with a lining, nor have I shown any kind of a lining or facing for the cooperating part 6. Such facing or lining, however, is well known in the art, and it is not considered necessary to describe the same in detail herein, nor the method of applying the same should it be found desirable to use it.

Figures 7, 8, 9:
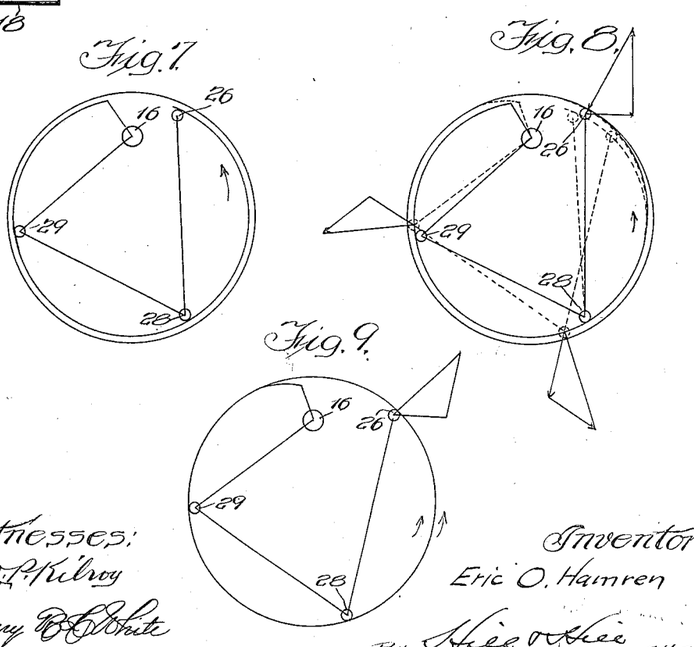
Figs. 7, 8 and 9 are diagrammatic views illustrating the operation of the clutch mechanism.

In Figs. 7, 8 and 9 of the drawings there is shown diagrammatically the working action of the clutch. Fig. 7 shows the ring 19 disengaged. When the member 31 is moved in, the yoke member is spread to first engage the driving and driven members at the point 26, swinging the yoke and split ring about the pivot 16, as shown in dotted lines in Fig. 8 and in full lines in Fig. 9, the ring also engaging the driven member at the points 28 and 29. The release or withdrawal of the member 31 from its spreading of the yoke will cause the yoke and ring to pivot about the point 16 in the reverse direction to positively pull the ring away from the driven member to stop the rotation of said driven member.

Figure 10:
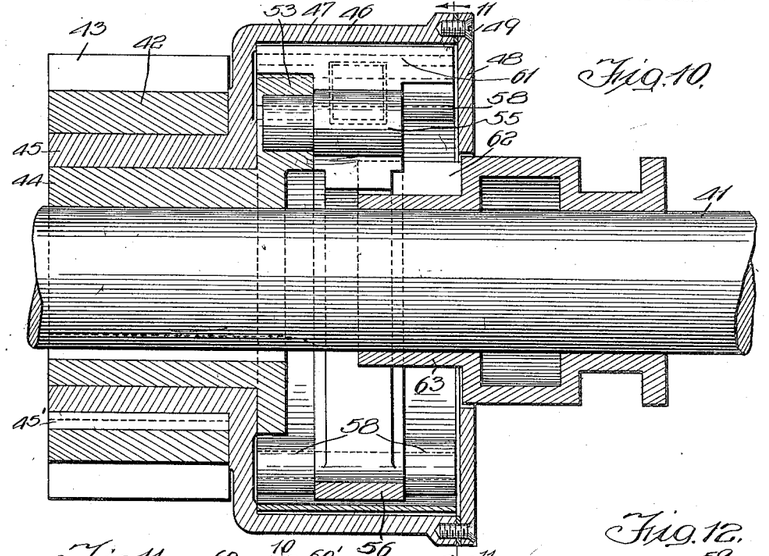
Fig. 10 is a sectional view taken substantially on line 10—10 of Fig. 11, similar to Fig. 1, illustrating a slightly modified construction in which the driving element may be operated in either direction.
Figures 11, 12:
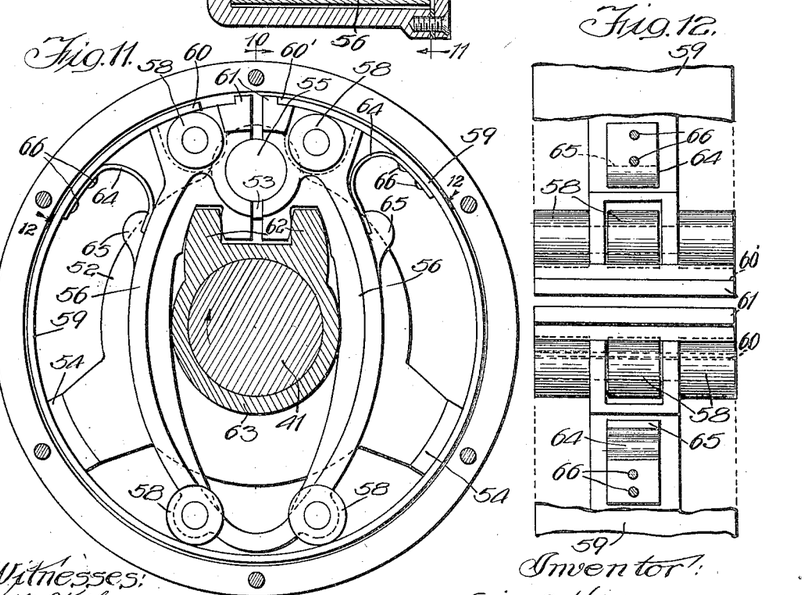
Fig. 11 is a sectional view taken substantially on line 11—11 of Fig. 10.
Fig. 12 is a sectional view taken substantially on line 12—12 of Fig. 11.

In Figs. 10, 11 and 12 there is shown a clutch arranged to drive the driven element in either direction, depending upon the direction of the rotation of the driving shaft 41. Referring to the figures mentioned, 41 represents a driving shaft or the like, and 42 a driven element of the desired type, that is, the same may be a gear as shown, or a sprocket, gear, pulley or the equivalent. Arranged on the shaft and suitably secured thereto is the member 44 corresponding to part 4 previously described, the same being provided with the part 45, to which part 42 may be keyed or otherwise secured thereto, as indicated at 45′, and which is provided with an extending casing part 46 constructed with the friction face 47. 48 represents the end plate secured in place by screws 49, it being understood that this may be made as desired. The part 44 is provided with the parts 52, 53 and 54 similar to those previously described in the other construction, and also carries the pin 55. Loosely carried by the pin 55 is the yoke member 56 carrying the pins 58 substantially similar to the pins described in the other construction. Arranged within the casing is the friction element or ring 59, 60 and 60′ representing the ends of the same. With this particular construction, the friction ring is not secured at either end or at all to the member 56, but is substantially loosely arranged within the casing, although caused to rotate with the driving element. As shown, the part 56 is provided with the extending lugs 61 arranged to form a stop or abutment for either end of the friction element. In this construction, as in the other, there is provided the controlling member 63 having the ribs 62 for controlling the yoke member 56. I have shown the friction element or ring provided with members 64 arranged to engage brackets 65 on the part 56, the same being so arranged that it will positively cause the disengagement of the friction ring with the friction face 47 when the clutch is released. When the driving member is driven in either direction, the throwing in of the cams will cause the member 56 to expand at its ends, and, dependent upon which direction the shaft is driven, the member 56 will engage a free end of the spring ring 59 to expand it into friction driving contact with the member 46.

With this double acting or reversible driving construction, stop 61 engages the end 60′ of the friction ring and substantially anchors that end, the other end being the free end. Referring to Figs. 10 to 12, when the driving member is driven in the direction indicated by the arrow in Fig. 11, then end 60 will be substantially the free end of the spring and end 60′ will abut against the stop. Obviously when yoke member 56 is expanded as described, the friction ring will be expanded into engagement with the driven element, causing that to be driven, thereby transmitting power as desired. Upon releasing the clutch mechanism by moving member 63 outwardly, the clutch mechanism will become inoperative, and in this connection it will be noted that the friction ring is pulled away from the friction face and substantially releases as previously described. If the driving member is driven in the opposite direction, the result will be the same. The prongs or parts 65, arranged to cooperate with the cooperating members 64, may be extended sufficiently to be in engagement with the members 64 at all times if desired, so that a connection is formed between the carrier and the friction member to prevent the latter being thrown out by the centrifugal force and thereby preventing its contacting with the friction face and dragging over the same.

The basic working principle of the clutch, when being engaged or brought into operation is as follows:—

Assume that the loose end of the friction band 19 is at the right side of the axis as shown (Figs. 2 and 3), the tight end being on the left side. The clutching movement (sliding the sleeve 31 to the left) forces the free end 18 of the carrier or yoke against the loose end 20 of the band, which in turn is pressed against the drum or flange. Assuming that the shaft 1 rotates the drum in a clockwise direction, it will be seen that the drum tends to take the loose end of the band with it, due to friction therebetween, but as the band is limited in its circumferential movement the same will expand and confine itself within the drum and exert a pressure outwardly or radially thereof, this pressure increasing in amount gradually from the loose end to the tight end where the maximum pressure is reached, said pressures following the logarithmic function for friction in band-brakes. The tight end of the band is fixed to the carrier, which in turn is pivoted about the pin 15. The pressure from the tight end, therefore, acts on the carrier, which in turn pivots and reacts against the band and drum with a pressure proportional to the radial distance from the tight end of the band to the pivot of the carrier. To sum up, it is apparent that the pressure or friction at the tight end is utilized to further increase its own friction.

It will be noted that with all of the constructions described herein, the pressure is substantially completely released between the carrier and the friction ring before the friction ring is brought back to its disengaged position. The first movement of the members 31 or 63 to release the clutch mechanism immediately relieves all pressure of the flexible and substantially floating carrier on the friction ring, thereby securing the effects previously described. It should be understood that I have only shown the preferred embodiment of my invention and that the yoke and friction element may be varied, a yoke made up of several links suitably secured together affording substantially the same effect as the one-piece yoke shown, and in this case instead of a one-piece ring or friction element, this may be made in segments or shoes carried by the yoke, affording the same effect as the construction illustrated. It may be also mentioned that I have set forth and particularly described the mechanism as adapted for a clutch for transmitting power, but obviously where one of the members corresponding to either the driving or driven member is stationary, the device makes a very satisfactory friction brake. The device is therefore adapted not only to transmit motion, but also, if desired, to be employed for preventing the transmission of motion.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned,

What I claim as new and desire to secure by Letters Patent is:

1. A plurality of elements and mechanism for operatively connecting the same whereby one may be driven by the other, said mechanism comprising a friction element, a resilient expander therefor arranged to carry said friction element and engage the same at a plurality of spaced points, and operating means for rocking said expander.

2. A plurality of elements and mechanism for operatively connecting the same whereby one may be driven by the other, said mechanism comprising a friction member arranged to engage one of said elements, a resilient expander yoke therefor loosely carried by one of said elements and arranged to carry and engage the friction member at a plurality of points, and means for controlling said expander.

3. A plurality of movable elements and mechanism for operatively connecting the same whereby one may be driven by the other, said mechanism comprising a friction ring, a resilient expander therefor pivotally arranged on an axis parallel to and to one side of the rotational axis of the driving element to support the ring and operatively connect it to one of said elements and operatively engage the same at a plurality of points and expand it into driving engagement with the other of said elements, and means for controlling said expander.

4. In a device of the kind described and in combination, a rotatable driving element, a rotatable driven element, and means for operatively connecting the same, comprising a friction ring arranged to operatively engage one element, and resilient means substantially loosely carried by the other element at a point at one side of its axis of rotation for carrying said friction ring and expanding said ring and maintaining the same in engagement with the other element through its length.

5. In a device of the kind described and in combination, a rotatable driving element, a rotatable driven element, and means for operatively connecting the same, comprising a friction ring arranged to operatively engage one element, and resilient expansible means substantially loosely carried by the other element at a point at one side of its axis of rotation for carrying and expanding said ring and maintaining the same in engagement with the other element through its length or positively disengaging the ring from said element.

6. In a device of the kind described and in combination, a driving element, a driven element and means for operatively connecting the same, comprising a friction ring arranged to engage one of said elements, a resilient yoked carrier for said friction ring pivotally carried by the other element at a point outside the axis of rotation thereof and operable to engage the ring at a plurality of points intermediate its ends, and means for controlling said carrier to pivot it on said offset pivotal axis, whereby the friction ring is brought into engagement with one of said first mentioned elements at a plurality of points.

7. In a device of the kind described and in combination, a driving member, a driven member journaled on said driving member, and means for transmitting rotary movement therebetween, comprising a resilient split ring between said members and arranged to frictionally engage one of them, and a resilient expansible carrier for expanding said ring at a plurality of points, and pivotally carried by one of said members at one side of its driving axis, and means for actuating said carrier to control the expansion or contraction thereof and of said ring, said last mentioned means being mounted on the same member as said carrier.

8. In a device of the character described and in combination, a driving member, a driven member journaled on said driving member and having a flange surrounding it, and means for transmitting rotary movement therebetween, said means comprising a resilient split ring adapted to be moved into frictional contact with said driven member, a carrier for said split ring pivotally mounted on said driving member at a point offset from its rotational axis, rollers on said carrier adapted to engage and control the expansion or contraction of said ring, and means for actuating said carrier, said means comprising a member loosely mounted on the driving shaft and operable to engage said carrier.

9. In a device of the kind described and in combination, a driving member, a driven member journaled thereon, and means for transmitting rotary movement therebetween, said means comprising a yoke-shaped resilient split carrier member straddling the driving member and pivotally carried thereby, said pivotal axis being offset from and parallel to the rotational axis of said driving member, an expansible friction element carried by said carrier member, a plurality of bearing rollers on said carrier adapted to engage said expansible friction element at a plurality of points, said carrier having a cam-way therein, and a cam carried by the driving member and operable to engage said cam-way to expand or contract said carrier, whereby the expansible friction element is moved into or out of engagement with said driven member.

10. In a device of the kind described and in combination, a driving member mounted upon a shaft, a driven member journaled on said driving member, and means for transmitting rotary movement therebetween, said means comprising a resilient split ring adapted to be expanded into contact with said driven member, a resilient split carrier secured to said ring, said carrier being pivotally mounted eccentrically of said drive shaft, a pair of parallel spaced lugs and recesses on said carrier, and actuating means for controlling the expansion or contraction of said carrier, said actuating means being freely mounted on said shaft and having spaced ribs engageable in said recesses to expand or contract said carrier and ring.

11. In a device of the kind described and in combination, a driving member mounted upon a shaft, a driven member journaled on said driving member, and means for transmitting rotary movement therebetween, said means comprising a resiliently expansible friction ring, a carrier for said resilient ring, said carrier straddling said shaft and comprising a one-piece split yoke, one of the split ends being secured to one end of said ring, a pin secured to said driving member and pivotally mounted in said carrier, said pin being spaced radially from the rotational axis of said shaft, each of said split ends of the carrier having a recess therein, a collar freely movable on said shaft and having a pair of mutually divergent cam projections, whereby when said collar is moved in one direction along the shaft, said projections will engage in said grooves on the carrier to expand the carrier and ring and transmit drive between said driving and driven members, and when the collar is moved longitudinally of the shaft in the opposite direction, it will contract said carrier and ring and disengage said driving and driven members.

12. In a device of the kind described and in combination, a drive shaft, a driving member rotatively carried thereby, a driven member journaled upon said driving member and having a flange surrounding the same, and means for transmitting rotary movement between said driving and driven members, said means comprising a resilient expansible split ring arranged within said flange, a resiliently expansible carrier for said split ring, said carrier having split ends and being pivotally mounted on said driving shaft on an axis offset from the rotational axis thereof, rollers carried by said carrier and engageable with said ring at a plurality of circumferentially spaced points, a spider for limiting the inward contractile movement of said split ring, a collar slidable longitudinally of the shaft, and means for controlling the expansible and contractile movement of said carrier, said means comprising cam-ways at the split ends of said carrier and mutually divergent longitudinally extending cams on said collar and engageable in said cam-ways, whereby movement of the collar in one direction will expand the carrier, moving the rollers against the ring, whereby the ring will be in contact with the driven member substantially throughout its length, and movement in the opposite direction upon said shaft will release said drive.

13. In a device of the kind described and in combination, a drive shaft, a driving member secured thereto, a driven member journaled on said driving member, and means for transmitting rotary movement between said driving and driven members, said means comprising a resilient split ring engageable with said driven member, a resilient split carrier for said ring, said carrier being substantially U-shaped and straddling said drive shaft and having recesses at its ends to form a pivotal bearing, a pin on said driving member and pivotally engageable in said recesses to carry the carrier, the axis of said pin being radially spaced from said drive axis, a plurality of circumferentially spaced rollers on said carrier and adapted to engage said ring, a cam-way on said carrier and a cooperating cam slidably carried by said shaft and engageable with said cam-way on the carrier to expand or contract the same, whereby the rollers carried thereby are moved into or out of engagement with said ring to force the same into or out of engagement with the driven member, and a member at the free end of the ring for releasing the ring from the driven member when the carrier is contracted, said member comprising a resilient strip on said ring and engageable with the inner side of one of said rollers.

14. In a mechanism of the kind described and in combination, a driving shaft, a driving member secured thereto, a driven member journaled on said driving member and having a flange surrounding the same, and means for transmitting rotary movement between said driving and driven members, said means comprising a split expansion ring substantially concentrically within said flange, a carrier for said ring, said carrier comprising a yoked expansible member straddling said drive shaft, one end of said ring being secured to one of said yoke legs, a series of rollers arranged on said carrier and circumferentially spaced within said ring, the ends of said yoke being recessed to provide a bearing, a pivot pin journaled in said recess and secured to said driving member, the axis of said pivot pin being spaced radially from the rotational axis of the driving member, means for expanding and contracting said carrier whereby the rollers will be engaged with and disengaged from said ring, and means for disengaging the free end of said ring from the driven member upon contraction of the carrier, said last mentioned means comprising a spring arranged at the extreme end of the ring and yieldingly engageable with one of the rollers in contact with said ring, whereby when the carrier is contracted the roller engageable with said spring will actuate said spring and positively break the engagement of the ring and driven member.

15. In a device of the kind described and in combination, a drive shaft, a driving sleeve secured thereto, a driven member journaled on said sleeve, said driven member having a casing surrounding said sleeve, and means for transmitting rotary movement between said shaft and driven member, said means comprising a resilient split ring arranged within said casing, a pivot pin carried by said driving sleeve, a U-shaped carrier pivotally mounted on said pin within said casing, said carrier straddling said shaft and pivotally mounted at its open ends on said pivot pin, the axis of said pivotal mounting being parallel to and spaced from the rotational axis of said shaft, means for limiting the inward contractile movement of said ring, said means comprising spider arms on said sleeve whose arms terminate adjacent said ring, one end of said ring being secured to one end of said carrier, a plurality of rollers carried by said carrier and engageable with said ring and spaced circumferentially thereof, said carrier having a pair of recesses at its ends and extending longitudinally of the pivot pin, a collar freely journaled on the shaft and slidable longitudinally thereof, said collar having a pair of upstanding ribs thereon mutually divergent for a portion of their length and parallel near their convergent ends, the spacing of said ribs at their parallel portions being substantially equal to the normal spacing of said recesses in the carrier, whereby said collar may be moved longitudinally of said shaft and the convergent ribs will engage in the recesses of the carrier to positively expand the carrier so that the rollers carried thereby will be moved outwardly and positively expand the ring carried by said carrier into engagement with the driven member.

16. In a device of the kind described and in combination, a drive shaft, a driving sleeve secured thereto, a driven member journaled on said sleeve, said driven member having a casing surrounding said sleeve, and means for transmitting rotary movement between said shaft and driven member, said means comprising a resilient split ring arranged within said casing, a pivot pin carried by said driving sleeve, a U-shaped carrier within said casing, straddling said shaft and pivotally mounted at its open ends on said pin, the axis of said pivotal mounting being parallel to and spaced from the rotational axis of said shaft, means for limiting the inward contractile movement of said ring, said means comprising spider arms on said sleeve whose arms terminate adjacent said ring, one end of said ring being secured to one end of said carrier, a plurality of rollers carried by said carrier and engageable with said ring and spaced circumferentially thereof, said carrier having a pair of recesses at its ends and extending longitudinally of the pivot pin, a collar freely journaled on the shaft and slidable longitudinally thereof, said collar having a pair of upstanding ribs thereon mutually divergent for a portion of their length and parallel near their convergent ends, the spacing of said ribs at their parallel portions being substantially equal to the normal spacing of said recesses in the carrier, whereby said collar may be moved longitudinally of said shaft and the convergent ribs will engage in the recesses of the carrier to positively expand the carrier so that the rollers carried thereby will be moved outwardly and positively expand the ring carried by said carrier into engagement with the driven member, one of said rollers being mounted adjacent the free end of said ring, and means cooperating with said roller to positively break the engagement of the ring with the driven member when the carrier is contracted, said means comprising a spring secured at the free end of said ring and inwardly bent so as to yieldingly contact with said roller.

17. In a device of the kind described and in combination, a rotatable driving element, a rotatably driven element, and means for operatively connecting the same comprising a friction ring arranged to operatively engage one element and resilient carrier means substantially pivotally carried by the other element at a point to one side of its axis of rotation for carrying said friction ring, and means for rocking said carrier to expand it to control said ring.

18. A plurality of elements and mechanism for operatively connecting the same, whereby one may be driven by the other, said mechanism comprising a friction member arranged to engage one of said elements, a resilient expander yoke therefor pivotally carried by one of said elements on an axis parallel to the rotational axis of said elements at one side thereof and arranged to carry and engage the friction member at a plurality of points, and means for rocking said yoke on its pivotal axis for controlling said friction member.

19. In a device of the kind described and in combination, a driving shaft, a driven element, a drum journalled on said shaft, and means for operatively connecting said driving and driven elements, comprising a split, resilient band adapted to frictionally engage said drum, a split resilient yoke straddling the shaft and supportingly engaging said band at a plurality of circumferentially spaced points, said yoke having one end fixed to one end of said band, and the other end slidably engageable therewith, and a pin carried by said shaft and offset from the rotational axis thereof, and pivotally carrying said yoke.

In testimony whereof, I have hereunto signed my name in the presence of two subscribing witnesses.

ERIC O. HAMREN.

Witnesses:
 Roy W. Hill,
 Bertha Hartmann.